(12) United States Patent
Clermont

(10) Patent No.: US 11,686,556 B2
(45) Date of Patent: Jun. 27, 2023

(54) OPERATIONAL SECTION OF ARMORED VEHICLES COMMUNICATING WITH A FLEET OF DRONES

(71) Applicant: JOHN COCKERILL DEFENSE SA, Loncin (BE)

(72) Inventor: Bernard Clermont, Fleron (BE)

(73) Assignee: JOHN COCKERILL DEFENSE SA, Loncin (BE)

( * ) Notice: Subject to any disclaimer, the term of this patent is extended or adjusted under 35 U.S.C. 154(b) by 96 days.

(21) Appl. No.: 17/427,668

(22) PCT Filed: Dec. 18, 2019

(86) PCT No.: PCT/EP2019/086080
§ 371 (c)(1),
(2) Date: Aug. 2, 2021

(87) PCT Pub. No.: WO2020/160828
PCT Pub. Date: Aug. 13, 2020

(65) Prior Publication Data
US 2022/0136807 A1    May 5, 2022

(30) Foreign Application Priority Data
Feb. 4, 2019   (EP) .................................... 19155196

(51) Int. Cl.
*F41H 11/02*  (2006.01)
*B64C 39/02*  (2023.01)
(Continued)

(52) U.S. Cl.
CPC ............ *F41H 11/02* (2013.01); *B64C 39/024* (2013.01); *B64U 2101/20* (2023.01); *B64U 2201/10* (2023.01); *F41H 7/02* (2013.01)

(58) Field of Classification Search
CPC ........... F41H 11/02; F41H 7/02; B64C 39/024
(Continued)

(56) References Cited

U.S. PATENT DOCUMENTS 9,852,639 B2   12/2017   Teng et al.
10,139,838 B2  11/2018   Lection et al.
(Continued)

FOREIGN PATENT DOCUMENTS

EP      3410057 A1   12/2018
RU      2669248 C1   10/2018
(Continued)

*Primary Examiner* — Samir Abdosh
(74) *Attorney, Agent, or Firm* — Leydig, Voit & Mayer, Ltd.

(57) ABSTRACT

A system for performing a collaborative and smart mission assigned over a determined area includes: a plurality of land bases that communicate with one another by communication, analysis, and/or examination means; at least one satellite drone associated with each base of the plurality of land bases, each satellite drone of the at least one satellite drone performing the assigned mission or part of the assigned mission, such that different drones of the at least one satellite drone form a flotilla whose members communicate with each other and directly or indirectly with the plurality of land bases by communication, analysis, and/or examination means respectively assigned to relations of the different drones with each other and of the plurality of land bases with the different drones. The mission is assigned by the plurality of land bases to the flotilla of drones in one or several determined zones.

17 Claims, 2 Drawing Sheets

(51) Int. Cl.
*F41H 7/02* (2006.01)
*B64U 101/20* (2023.01)

(58) Field of Classification Search
USPC .......................................................... 89/1.11
See application file for complete search history.

(56) References Cited

U.S. PATENT DOCUMENTS

| | | | |
|---|---|---|---|
| 10,795,380 B1* | 10/2020 | Patton | G08G 5/0069 |
| 2009/0157233 A1 | 6/2009 | Kokkeby et al. | |
| 2010/0017046 A1 | 1/2010 | Cheung et al. | |
| 2015/0242972 A1* | 8/2015 | Lemmey | H04L 63/20 |
| | | | 705/80 |
| 2017/0261999 A1* | 9/2017 | Van Voorst | G01S 7/51 |
| 2018/0107209 A1 | 4/2018 | Hardee et al. | |
| 2018/0218617 A1 | 8/2018 | Shaw et al. | |
| 2018/0319495 A1* | 11/2018 | Tu | H04W 84/06 |
| 2018/0341262 A1 | 11/2018 | Yeshurun | |
| 2018/0364713 A1 | 12/2018 | Foster, II et al. | |
| 2022/0274703 A1* | 9/2022 | Di Cosola | G06V 20/17 |
| 2022/0399936 A1* | 12/2022 | Arksey | H04W 64/003 |

FOREIGN PATENT DOCUMENTS

| | | | | |
|---|---|---|---|---|
| WO | WO-2021160484 A1 * | 8/2021 | | B60L 53/51 |
| WO | WO-2021174291 A1 * | 9/2021 | | B64C 39/024 |

* cited by examiner

OPERATIONAL SECTION OF ARMORED VEHICLES COMMUNICATING WITH A FLEET OF DRONES

CROSS-REFERENCE TO PRIOR APPLICATIONS

This application is a U.S. National Phase application under 35 U.S.C. § 371 of International Application No. PCT/EP2019/086080, filed on Dec. 18, 2019, and claims benefit to European Patent Application No. EP 19155196.9, filed on Feb. 4, 2019. The International Application was published in French on Aug. 13, 2020 as WO 2020/160828 under PCT Article 21(2).

FIELD

The present invention relates to the technological field of communication devices and the management of a flotilla of drones in an operational theater.

The invention also relates to the field of military land vehicles, for example a section of armored vehicles, in communication with such a flotilla of drones.

A drone, or UAV (unmanned aerial vehicle), refers to a pilotless or crewless aircraft that is most often remotely controlled or programmed. The drones considered here are generally for military use.

BACKGROUND

Document RU 2669248 C1 relates to the field of military equipment, in particular armored vehicles. A tank that is highly protected owing to a control system via ground combat robots and UAVs is made up of an armored body with dynamic protection elements and several compartments. The control compartment comprises the workstations for the captain, the gunner and the driver-mechanic, made up of separate cells protected with emergency exit hatches located in the side parts. The firearms compartment contains the fire-control system with target aiming and automatic tracking devices. Furthermore, the tank is equipped with daytime and nighttime technical vision, a control and information system based on the tank and radio detection means. Furthermore, in the design of the tank, two protected capsules have been introduced with workstations for the operators who control the ground combat robots and the UAVs.

Document US 2018/0341262 A1 discloses a system allowing the active protection of a target with respect to a threat. The system comprises one or several platforms configured to steer the operation of the system, and one or several unmanned aerial vehicles (UAV) configured to operate near the target and to allow the detection and/or neutralization of the threat. The platform is configured to detect and supply instructions for neutralization of the threat autonomously, and each of the unmanned aerial vehicles is configured to communicate with the platform.

Document US 2018/0218617 A1 describes concepts and technologies regarding the smart management of drone traffic via a radio access network (RAN). A RAN node, such as an eNodeB, can receive a flight configuration from a drone. The flight configuration can include a drone identifier and a drone route. The RAN node can determine whether a capacity is available in an airspace associated with the RAN node. In response to the determination of the available capacity in the airspace associated with the RAN node, the RAN node can add the ID of the drone to a queue of drones waiting to use the airspace associated with the RAN node. When the ID of the drone is the next one in the queue of drones waiting to use the airspace associated with the RAN node, the RAN node can ask the drone to fly over at least part of the airspace according to the itinerary of the drone.

Document US 2010/0017046 A1 discloses a system for collaborative engagement of uninhabited aerial and land vehicles for locating, identifying and tracking a target in a certain number of urban or non-urban environments, under the supervision of an operator. The collaborative engagement system examines the uninhabited vehicles in order to maintain a line of sight between a predetermined target and at least one of the aforementioned uninhabited vehicles and imparts information to the vehicles in order to decide on positions that will maximize the potential lines of sight; predict, with operator support, where the target will go; and allow the groups of vehicles to collaborate while ensuring total coverage of the target. The system is based on a collaboration and coordination between land and aerial vehicles, so that at least one of the vehicles maintains contact with the target, in the event the target is out of sight of the other vehicles. The system thus includes an examination subsystem facilitating the examination, communication and exchange of data to and between the uninhabited vehicles, via a shared protocol.

Document U.S. Pat. No. 9,852,639 B2 discloses a mission generating system that generates a flight path located within the borders of the mission and which incorporates the flight path in an optimized reconnaissance mission plan in order to capture aerial images of a target by using a UAV. The system generates a mission based on images of sites, borders and flight scenarios.

Document US 2018/0319495 A1 discloses a network of relay drones allowing increasingly close communication over a long distance or in case of obstacle between a base station and a working drone.

Document U.S. Pat. No. 10,139,838 B2 discloses a logistical management system for a plurality of drones suitable for delivering products to clients. The total efficiency related to power consumption and/or time used can be monitored. It is possible to use cloud computing as a service model to allow practical and on-demand access to a set of shared computing resources, which can be implemented with minimal management efforts with respect to the service provider.

Document US 2018/0107209 A1 describes a system for managing a vehicle/drone pair where the presence of the drone is managed in a restricted or regulated in-flight access space (military, airport) by the assistance of the vehicle on the ground, which allows the drone to avoid flying in the zone while being supported by the vehicle on the ground.

Document US 2018/0364713 A1 discloses a computing and examining system of the deployment of a set of drones, with assignment of a route to each drone, flight examination and arrival at destination, taking account of constraints such as the weather supplied by an outside service in a cloud environment, prohibited flight zones, etc.

Document US 2009/0157233 A1 discloses an autonomous and predictive system for tracing and monitoring a target by UAVs, in order to avoid errors by human operators. The system comprises a planning module in order to organize the flight by UAVs.

SUMMARY

In an embodiment, the present invention provides a system for performing a collaborative and smart mission assigned over a determined area, the system comprising: a plurality of land bases configured to communicate with one another by communication, analysis, and/or examination means; at least one satellite drone associated with each base of the plurality of land bases, each satellite drone of the at least one satellite drone being configured to perform the assigned mission or part of the assigned mission, such that different drones of the at least one satellite drone form a flotilla whose members are configured to communicate with each other and directly or indirectly with the plurality of land bases by communication, analysis, and/or examination means respectively assigned to relations of the different drones with each other and of the plurality of land bases with the different drones, wherein the mission is assigned by the plurality of land bases to the flotilla of drones in one or several determined zones, distal from the plurality of land bases, such that, once the mission is assigned to the drones by the plurality of land bases, the communication, analysis, and/or inspection means are configured to generate a collaborative and autonomous action of the drones so as to carry out the mission in a smart and streamlined manner, the autonomous action comprising an at least temporary interruption in communication and examination with/by the plurality of land bases, wherein the system further comprises: an examination system configured to compile requests from the plurality of land bases and to communicate the requests to a management system of the drones, the management system being configured to optimize use, manage a deployment of the drones in order to fulfill the mission, and manage a return of requested information to the plurality land bases, wherein the management system is: autonomous and smart, in that the management system is configured to manage itself in whole or in part, independently of any human operator or an outside environment, and collaborative, in that, based on a connectivity between members of the management system, the management system calls on collaboration and participation of each of its members, owing to computer tools configured to share and exchange information, such that the drones organize themselves to perform the mission.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
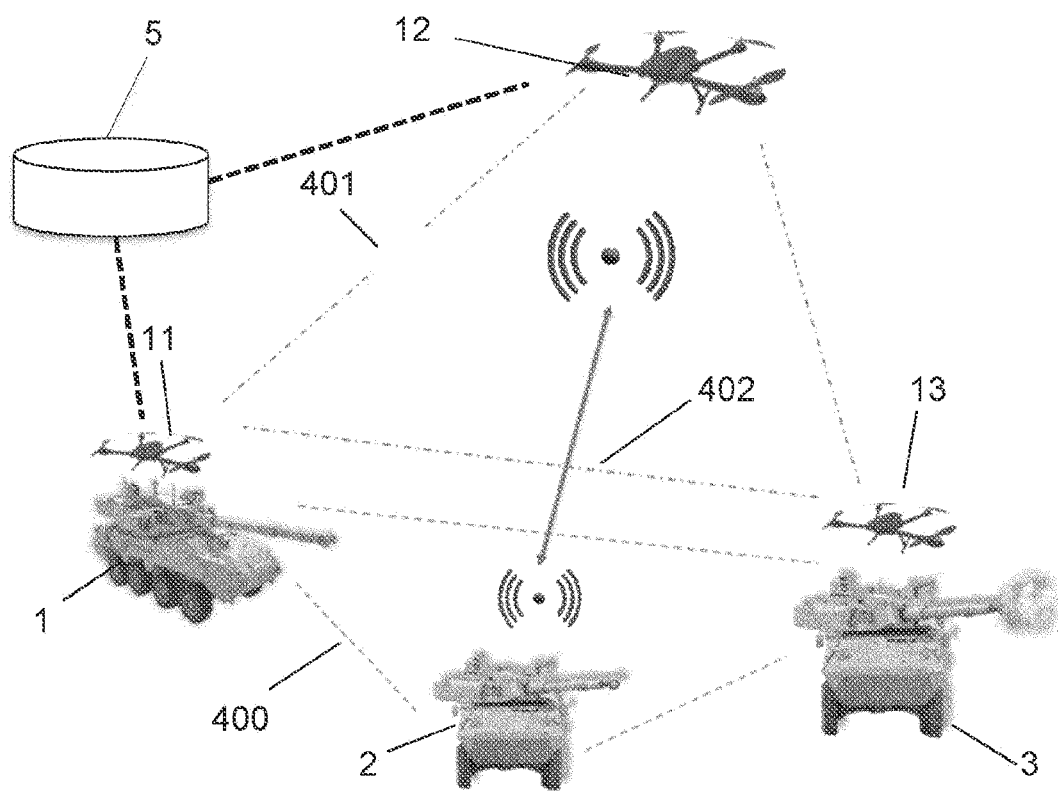
FIG. 1 schematically shows the system according to the invention for the performance of a collaborative and smart mission assigned in a determined space using a section of armored vehicles and a flotilla of drones that communicate with one another.

In an embodiment, the present invention meets the need of a user who wishes to perform site reconnaissance using autonomous drones associated with land vehicles.

In an embodiment, the present invention in particular ensures the efficiency of a positioning, detection and/or observation mission performed by a section of land bases associated with a flotilla of drones.

In an embodiment, the present invention further relates to a streamlined, optimized and smart use of all of the drones in the performance of a determined mission, in particular to reduce the operational usage time of each drone.

In an embodiment, the present invention reduces the energy consumption of the individual drones during the performance of a mission in order to increase the duration thereof.

A first aspect of the present invention relates to a system for performing a collaborative and smart mission assigned over a determined area, said system comprising:

at least one base;

at least one satellite robot associated with said at least one base, each satellite robot being able to perform the assigned mission or part of the assigned mission, such that different robots constitute a flotilla whose members are capable of communicating with said at least one base and with one another;

means of communication, analysis and/or examination respectively assigned to the relations of the robots with one another and of said at least one base with the robots;

the mission being assigned by said at least one base of the flotilla of robots in one or several determined zones, distal from the base;

characterized in that:

the system comprises a plurality of bases capable of communicating with one another owing to the communication, analysis and/or examination means;

at least one robot is associated with each of the bases;

all of the robots of the flotilla are capable of communicating directly or indirectly with all of the bases owing to the communication, analysis and/or examination means, such that, once the mission is assigned to the satellite robots by the base(s), the communication, analysis and/or inspection means are able to generate a collaborative and autonomous action of the robots so as to carry out the mission in a smart and streamlined manner, said autonomous action involving an at least temporary interruption in communication and examination with/by the bases.

In the present context, a satellite robot refers to an apparatus with an automatic control system, generally electronic, having a link of subjugation or dependence with the base with which it is associated.

According to preferred embodiments, the system of the invention further comprises at least one of the following features, or any suitable combination thereof:

the bases and the robots are land vehicles, maritime vehicles or aircraft;

the bases are land bases constituting a land platform and the robots are drones constituting an aerial platform;

the plurality of land bases or land platforms is distributed in one or several sections of armored vehicles;

each section comprises between 3 and 6 armored vehicles;

the assigned mission is a positioning, observation and/or detection mission or a mission to neutralize a threat;

when the assigned mission is a neutralization mission, it is limited to neutralizing enemy or spy drones;

the communication between the land bases and the drones and/or between the drones themselves is intermittent, the drones performing the smart mission autonomously;

in the case of a mission performed by all of the drones in an identical or similar zone, the communication, analysis and/or examination means are configured so that each drone performs all or part of the mission in turn, which makes it possible to increase the duration of the mission;

in the case of a mission performed by the drones in multiple distinct zones, the communication, analysis and/or examination means are configured to assign each drone a part of the mission in a respective determined zone, which allows a streamlined distribution of the mission between the different drones, without redundancy;

the communication, analysis and/or examination means respectively assigned to the relations of the land bases to one another, of the drones to one another and of the land bases with the drones comprise two-way radiofrequency communication means preferably using the 4G or 5G cellular technology;

the system comprises a virtual control station located in a land base or in a cloud;

the virtual control station is able to collect data and needs of the land and aerial platforms and to redeploy, allocate or exchange information between the platforms in order to optimize the continuity of the mission;

the virtual control station is able to manage, autonomously, the respective missions of different sections of armored vehicles and to optimize the cooperation between the sections and one or several groups of drones.

A second aspect of the present invention relates to a method for performing a collaborative and smart mission assigned over a determined military operational theater, using the system described hereinabove, comprising the following successive steps:

one or several land bases communicating with one another via the communication, analysis and/or examination means, define a mission to be performed in one or several determined distal zones of the bases and assign this mission to at least part of the flotilla of drones by the communication, analysis and/or examination means, the drones already being in flight or ready to take off;

the drones communicate with one another, analyze the mission and manage the performance of the mission in an autonomous, collaborative and streamlined manner owing to the communication, analysis and/or examination means, including with at least temporary interruption of communication and examination between the drones and the bases, so as to perform this mission in an optimized manner in space and time.

According to this method, once the mission has been assigned to the drones, the latter manage the performance thereof by an autonomous, collaborative and streamlined self-management, with no human intervention and without intense collaboration with the land bases or the outside environment.

Advantageously, all of the drones perform, sequentially and in turn, an identical or similar mission in a given zone.

Still advantageously, alternatively, the drones share a mission, in that each drone and only that drone performs its mission in a specific zone.

The system according to the invention comprises one or several land bases. It involves, for example, armored military vehicles or remotely operable bases such as remotely operable vehicles or turrets. A section of land bases is typically a combination of vehicles in a determined sector, generally comprising 3 or 4, no more than 6 vehicles.

Each land base is associated with one or several drones. For example, when the drone is not in flight, it can rest on a station belonging to the base, on which it can for example recharge its battery.

The land bases will control a mission, that is to say, a set of tasks to be performed by the drones.

In the context of the invention, the mission will generally be a positioning, observation or detection mission, for example of a threat. The mission may also comprise a limited aspect for neutralization of a threat, adapted to the neutralization means that optionally equip the drones, for example means for neutralizing spy drones.

An examining system will compile the requests from requesters (land bases) and communicate them to the management system of the drones, which will then optimize the use of the drones and manage the deployment of the drones in order to fulfill the requested mission(s) and lastly manage the return of the requested information to the requesters.

In other words, the drones organize themselves to accomplish the defined mission communicated by the land bases. The analysis and management system of the drones and the mission that is assigned to them is:

autonomous and smart: it manages itself entirely or partially by its own laws, independently of any human operator or the outside environment;

collaborative: based on the connectivity between members, it calls on the collaboration and the participation of each of its members, in particular owing to computer tools adapted to the sharing and exchange of information.

The invention aims to implement a mixing of drone autonomy functionalities, with a collaboration between drones and land systems to perform the positioning, detection and observation mission. The mission is selected by one or several land bases in network communication. The coordination between drones is done automatically, based on a strong interconnectivity of the drones relative to one another (flight parameters, autonomy, vision, etc.). Even if the drones are capable of communicating with the bases (land vehicles) or a cloud, they must be able, according to the invention, to manage themselves at any moment in the execution of the mission through a collaboration with one another and not through an intense and continuous collaboration with the bases on the ground (unlike US 2010/0017046 A1).

FIG. 1 shows a non-limiting example of an operational section of three armored vehicles 1, 2, 3, which may be inhabited or uninhabited, also called land platform, associated with a squad or a flotilla of drones 11, 12, 13, also called aerial platform, each vehicle being able to accommodate, in idle mode, at least one drone when the latter is not in flight. The vehicles are capable of communicating with one another (triangle in dashes 400), and the drones are also capable of communicating with one another (triangle in solid lines 401), communications 402 of course existing between the bases and the drones.

According to one aspect of the invention, the set of drones is capable of organizing itself to react in a smart or streamlined manner to the orders from the vehicles. The drones are capable of dividing up the mission itself or different parts of the requested mission.

According to one aspect of the invention, a virtual control station 5 will advantageously be provided, which can be located in the turret of one of the armored vehicles or more generally in a cloud. This term refers to a computerized organizational model called "cloud computing" allowing access to digital resources whose storage is externalized on one or several remote servers.

A virtual control station refers to a control station grouping together hardware and software computer means coupled by communication means as well as people responsible for operations where both the hardware and software computer means as well as said responsible people are separate and/or are not physically located in the same place.

The system according to the invention can operate in the absence of dedicated human operators, at least on the operational theater.

The virtual control station 5 is able to collect the data and the needs of the land and aerial platforms and redeploys, distributes or exchanges information between the platforms in order to optimize the continuity of the mission.

The virtual control station 5 can manage, autonomously, the respective missions of different sections of armored vehicles and optimize the cooperation between the land sections and groups of drones.

Figure 2:
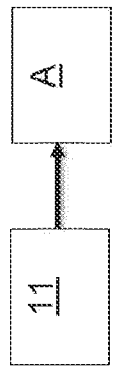
FIG. 2 shows an exemplary observation mission where all of the drones will observe the same zone in turn.
Figure 2:
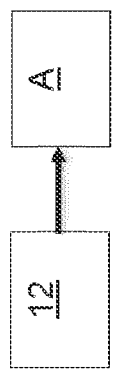
Figure 2:
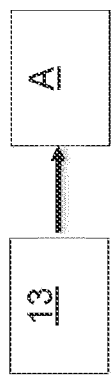

In a first operational example shown in FIG. 2, in the case where all of the drones have the same mission or a similar mission, such as the observation of a determined zone A, the drones 11, 12, 13, . . . can perform the mission in turn sequentially over time, which advantageously makes it possible to increase the duration of the mission, in light of the fact that the slight autonomy of a drone can be limited.

Figure 3:
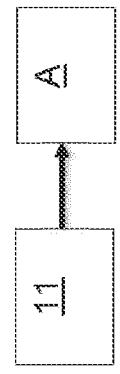
FIG. 3 shows an exemplary observation mission where the various drones will observe one and only one zone, all of the zones being different.
Figure 3:
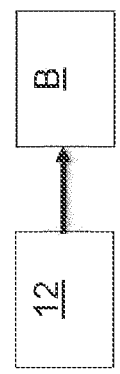
Figure 3:
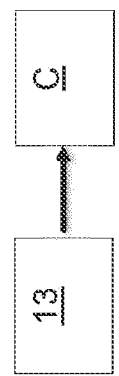

In another operational example shown in FIG. 3, there can be multiple zones to be observed. Thus, a smart communication between the drones and a streamlined distribution of the tasks make it possible to assign each drone a determined zone to be observed. For example, in the case of three zones A, B, C to be observed, the drone 11 will observe the zone A, the drone 12 will observe the zone B, and the drone 13 will observe the zone C. This is a simple example of collaboration between the different drones in order to accomplish the mission optimally, while avoiding any redundancy.

It is essential for the smart system by which the information is transmitted to the drones and between the drones to be able to operate periodically or discontinuously (and therefore not continuously) to overcome any scrambling attempt or to overcome any communication outage during the mission. Thus, the system organizes itself so that the mission is executed autonomously and in a coordinated manner.

The system according to the invention will advantageously comprise a specific and dedicated communication system between the bases, a system for managing communication between drones, a system for managing activities of the drones and means for securing different communication software applications. The radiocommunication systems will be mobile networks of the civilian, military or mixed type, for example 4G or 5G.

The system of the invention can be extended and generalized to a robotic system comprising a set of land, aerial or maritime bases associated with a set of satellite robots, also land, aerial or maritime, at least one robot being associated with each base. The set of robots, to which the bases assign a determined mission, analyze the mission received from the bases autonomously and manage the latter collaboratively, so as to perform this mission as efficiently as possible.

The system for communication between bases, preferably on land, and robots, preferably drones, according to the invention has the following advantages over the state of the art:

integration of the autonomy of the drones;
autonomy without human decision-making intervention;
independence of the system;
coordinated and optimized cooperation between a group of drones and a group of armored vehicles.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for performing a collaborative and smart mission assigned over a determined area, the system comprising:

a plurality of land bases configured to communicate with one another by communication, analysis, and/or examination means; and at least one satellite drone associated with each base of the plurality of land bases, each satellite drone of the at least one satellite drone being configured to perform the assigned mission or part of the assigned mission, such that different drones of the at least one satellite drone form a flotilla whose members are configured to communicate with each other and directly or indirectly with the plurality of land bases by communication, analysis, and/or examination means respectively assigned to relations of the different drones with each other and of the plurality of land bases with the different drones, wherein the mission is assigned by the plurality of land bases to the flotilla of drones in one or several determined zones, distal from the plurality of land bases, such that, once the mission is assigned to the drones by the plurality of land bases, the communication, analysis, and/or inspection means are configured to generate a collaborative and autonomous action of the drones so as to carry out the mission in a smart and streamlined manner, the autonomous action comprising an at least temporary interruption in communication and examination with/by the plurality of land bases, wherein the system further comprises:

an examination system configured to compile requests from the plurality of land bases and to communicate the requests to a management system of the drones, the management system being configured to optimize use, manage a deployment of the drones in order to fulfill the mission, and manage a return of requested information to the plurality land bases, wherein the management system is:

autonomous and smart, in that the management system is configured to manage itself in whole or in part, independently of any human operator or an outside environment, and collaborative, in that, based on a connectivity between members of the management system, the management system calls on collaboration and participation of each of its members, owing to computer tools configured to share and exchange information, such that the drones organize themselves to perform the mission.

2. The system of claim 1, wherein the plurality of land bases is distributed in one or several sections of armored vehicles.

3. The system of claim 2, wherein each section of the one or several sections comprises between three and six armored vehicles.

4. The system of claim 1, wherein the assigned mission is a positioning, observation, and/or detection mission, or a mission to neutralize a threat.

5. The system of claim 4, wherein, when the assigned mission is a neutralization mission, the assigned mission is limited to neutralizing enemy or spy drones.

6. The system of claim 1, wherein the communication between the plurality of land bases and the drones and/or between the drones themselves is intermittent, the drones performing the smart mission autonomously.

7. The system of claim 1, wherein, when the mission is performed by all of the drones in an identical or similar zone, the communication, analysis, and/or examination means are configured so that each drone performs all or part of the mission in turn, so as to increase the duration of the mission.

8. The system of claim 1, wherein, when the mission is performed by the drones in multiple distinct zones, the communication, analysis, and/or examination means are configured to assign each drone a part of the mission in a respective determined zone so as to streamline distribution of the mission between the different drones, without redundancy.

9. The system of claim 1, wherein the communication, analysis, and/or examination means respectively assigned to the relations of the plurality of land bases to one another, of the drones to one another, and of the plurality of land bases with the drones comprise two-way radiofrequency communication means.

10. The system of claim 2, the method further comprising:
a virtual control station located in a land base or in a cloud.

11. The system of claim 10, wherein the virtual control station is configured to collect data and needs of land platforms, comprising the plurality of land bases, and aerial platforms, comprising the drones, and to redeploy, allocate, or exchange information between the platforms optimize continuity of the mission.

12. The system of claim 11, wherein the virtual control station is configured to autonomously manage respective missions of different sections of armored vehicles and to optimize cooperation between the sections and one or several groups of drones.

13. A method for performing the collaborative and smart mission assigned over a determined military operational theater, using the system of claim 1, the method successively comprising:

one or several land bases communicating with one another via the communication, analysis, and/or examination means so as to define a mission to be performed in one or several determined distal zones of the bases and to assign the mission to at least part of the flotilla of drones by the communication, analysis, and/or examination means, the drones already being in flight or ready to take off;

the drones communicating with one another, analyzing the mission, and managing a performance of the mission in an autonomous, collaborative, and streamlined manner by the communication, analysis, and/or examination means, including with at least temporary interruption of communication and examination between the drones and the bases, so as to perform the mission in an optimized manner in space and time.

14. The method of claim 13, wherein, once the mission has been assigned to the drones, the drones are configured to manage performance of the mission by an autonomous, collaborative, and streamlined self-management, with no human intervention and without intense collaboration with the plurality of land bases or the outside environment.

15. The method of claim 13, wherein all of the drones perform, sequentially and in turn, an identical or similar mission in a given zone.

16. The method of claim 13, wherein the drones share the mission, in that each drone and only that drone performs its portion of the mission in a specific zone.

17. The system of claim 9, wherein the two-way radiofrequency communication means comprise 4G or 5G cellular technology.

* * * * *